US011072326B2

(12) United States Patent
Costa et al.

(10) Patent No.: US 11,072,326 B2
(45) Date of Patent: Jul. 27, 2021

(54) SYSTEMS AND METHODS FOR TRAJECTORY BASED SAFEKEEPING OF VEHICLES

(71) Applicant: Argo AI, LLC, Pittsburgh, PA (US)

(72) Inventors: Albert Costa, Pittsburgh, PA (US); Mark Ollis, Pittsburgh, PA (US); Thomas Petroff, Gibsonia, PA (US); Brett Browning, Pittsburgh, PA (US)

(73) Assignee: ARGO AI, LLC, Pittsburgh, PA (US)

( * ) Notice: Subject to any disclaimer, the term of this patent is extended or adjusted under 35 U.S.C. 154(b) by 202 days.

(21) Appl. No.: 16/547,718

(22) Filed: Aug. 22, 2019

(65) Prior Publication Data

US 2021/0053558 A1 Feb. 25, 2021

(51) Int. Cl.
*B60W 30/09* (2012.01)
*B60W 30/095* (2012.01)

(52) U.S. Cl.
CPC ........ *B60W 30/09* (2013.01); *B60W 30/0956* (2013.01); *B60W 2554/00* (2020.02)

(58) Field of Classification Search
CPC .................................................. B60W 30/09
See application file for complete search history.

(56) References Cited

U.S. PATENT DOCUMENTS

| 6,510,388 | B1 | 1/2003 | Sporrong et al. |
| 6,820,006 | B2 | 11/2004 | Patera |
| 8,146,703 | B2 | 4/2012 | Baumann et al. |
| 8,340,883 | B2 | 12/2012 | Arbitmann et al. |
| 9,229,453 | B1 | 1/2016 | Lee |
| 9,248,834 | B1 | 2/2016 | Ferguson et al. |
| 9,495,874 | B1 | 11/2016 | Zhu et al. |
| 9,517,767 | B1 * | 12/2016 | Kentley .............. B60W 30/095 |
| 9,555,781 | B2 * | 1/2017 | Breuer .................. B60W 30/09 |
| 9,630,619 | B1 * | 4/2017 | Kentley ................ G01C 21/32 |
| 10,005,464 | B2 | 6/2018 | Toyoda et al. |
| 10,026,318 | B2 * | 7/2018 | Maeda .................. B60W 30/09 |

(Continued)

FOREIGN PATENT DOCUMENTS

| EP | 3552921 A1 | 10/2019 |
| JP | 20100228740 A | 10/2010 |

OTHER PUBLICATIONS

Horst, John et al., "Trajectory Generation for an On-Road Autonomous Vehicle," The National Institute of Standards and Technolgoy, pp. 1-9, Sep. 2005.

(Continued)

*Primary Examiner* — Alex C Dunn
(74) *Attorney, Agent, or Firm* — Fox Rothschild LLP (57) ABSTRACT

Systems and methods for operating a vehicle. The methods comprise: generating, by a computing device, a vehicle trajectory for the vehicle that is in motion; detecting an object within a given distance from the vehicle; generating, by the computing device, at least one possible object trajectory for the object which was detected; performing, by the computing device, a collision check to determine that there remains time to react safely to worst-case behavior by the object (the collision check being based on the vehicle trajectory and at least one possible object trajectory); and performing operations, by the computing device, to selectively cause the vehicle to perform an emergency maneuver based on results of the collision check.

21 Claims, 6 Drawing Sheets

(56) References Cited

U.S. PATENT DOCUMENTS

| | | |
|---|---|---|
| 10,037,694 B2 | 7/2018 | Lee |
| 10,046,761 B2 | 8/2018 | Meyer et al. |
| 10,496,091 B1 | 12/2019 | Ross et al. |
| 10,564,639 B1 | 2/2020 | Zhu et al. |
| 10,745,003 B2* | 8/2020 | Kentley-Klay ........ B60Q 5/006 |
| 2003/0055563 A1 | 3/2003 | Jonas Lars et al. |
| 2008/0084283 A1 | 4/2008 | Kalik |
| 2013/0253816 A1 | 9/2013 | Caminiti et al. |
| 2017/0039855 A1 | 2/2017 | Maeda et al. |
| 2017/0120803 A1* | 5/2017 | Kentley ................ B60W 10/18 |
| 2017/0120902 A1 | 5/2017 | Kentley et al. |
| 2017/0217431 A1 | 8/2017 | Class et al. |
| 2017/0297568 A1* | 10/2017 | Kentley ................ G09G 5/363 |
| 2019/0025841 A1 | 1/2019 | Haynes et al. |
| 2019/0291726 A1* | 9/2019 | Shalev-Shwartz ........................... B60W 50/0097 |
| 2019/0291727 A1* | 9/2019 | Shalev-Shwartz .... B60W 10/18 |
| 2020/0026277 A1 | 1/2020 | Palanisamy et al. |
| 2021/0031760 A1* | 2/2021 | Ostafew ............... G05D 1/0214 |

OTHER PUBLICATIONS

Information about Related Patents and Patent Applications, see section 6 of the accompanying Information Disclosure Statement Letter, which concerns Related Patents and Patent Applications.

U.S. Appl. No. 17/060,837, filed Oct. 1, 2020, Methods and Systems for Predicting Actions of an Object by an Autonomous Vehicle to Determine Feasible Paths Through a Conflicted Area.

U.S. Appl. No. 17/060,817, filed Oct. 1, 2020, Methods and Systems for Performing Outlet Inference by an Autonomous Vehicle to Determine Feasible Paths Through an Intersection.

U.S. Appl. No. 17/060,928, filed Oct. 1, 2020, Systems and Methods for Imminent Collision Avoidance.

* cited by examiner

SYSTEMS AND METHODS FOR TRAJECTORY BASED SAFEKEEPING OF VEHICLES

BACKGROUND

Statement of the Technical Field

The present disclosure relates generally to on-board computers of vehicles. More particularly, the present disclosure relates to implementing systems and methods for trajectory based safekeeping of vehicles.

Description of the Related Art

Modern day vehicles have at least one on-board computer and have internet/satellite connectivity. The software running on these on-board computers monitor and/or control operations of the vehicles.

SUMMARY

The present disclosure concerns implementing systems and methods for operating a vehicle. The methods comprise: generating, by a computing device, a vehicle trajectory for the vehicle that is in motion; detecting an object within a given distance from the vehicle; generating, by the computing device, at least one possible object trajectory for the object which was detected; performing, by the computing device, a collision check to determine that there remains time to react safely to worst-case behavior by the object (where the collision check is based on the vehicle trajectory and at least one possible object trajectory); and performing operations, by the computing device, to selectively cause the vehicle to perform an emergency maneuver (e.g., accelerate-and-veer maneuver) or a cautious maneuver based on results of the collision check.

In some scenarios, the collision check comprises determining whether the vehicle trajectory and at least one possible object trajectory intersect each other. The vehicle trajectory is deemed safe when a determination is made that the vehicle trajectory and at least one possible object trajectory do not intersect each other.

In those or other scenarios, the collision check comprises determining a collision time when the vehicle trajectory and at least one possible object trajectory intersect each other. The collision time comprises a time at which the collision will occur if the vehicle trajectory is followed by the vehicle and at least one possible object trajectory is followed by the object. The collision time is compared to a threshold time value. The vehicle trajectory is deemed safe when the collision time is greater than the threshold time value.

In those or other scenarios, the collision check comprises determining whether the collision can be avoided if the vehicle trajectory is followed by the vehicle and any one of a plurality of dynamically generated emergency maneuvers is performed in a pre-defined period of time, when the collision time is equal to or less than the threshold time value. The vehicle is selectively caused to perform the emergency maneuver when a determination is made that the collision cannot be avoided in the pre-defined period of time. The dynamically generated emergency maneuvers may include, but are not limited to, an emergency maneuver that includes a braking command and is determined based on the vehicle trajectory and at least one possible object trajectory, an emergency maneuver that includes at least two of a steering command, a braking command and an acceleration command, and that is determined via a gradient descent from an active vehicle trajectory on an objective function which penalizes collision and ride discomfort, and a pre-defined emergency maneuver that has been optimized via a gradient descent from the active vehicle trajectory on the objective function which penalizes collision and ride discomfort.

The systems comprise a processor and a non-transitory computer-readable storage medium. The non-transitory computer-readable storage medium comprises programming instructions that are configured to cause the processor to implement a method for operating a vehicle. The programming instructions comprise instructions to: generate a vehicle trajectory for the vehicle that is in motion; detect an object within a given distance from the vehicle; generate at least one possible object trajectory for the object which was detected; perform a collision check to determine that there remains time to react safely to a worst-case behavior by the object (the collision check being based on the vehicle trajectory and at least one possible object trajectory); and selectively cause the vehicle to perform an emergency maneuver (e.g., accelerate-and-veer maneuver) or a cautious maneuver based on results of the collision check.

In some scenarios, the collision check comprises determining whether the vehicle trajectory and at least one possible object trajectory intersect each other. The vehicle trajectory is deemed safe when a determination is made that the vehicle trajectory and at least one possible object trajectory do not intersect each other.

In those or other scenarios, the collision check comprises determining a collision time when the vehicle trajectory and at least one possible object trajectory intersect each other. The collision time comprises a time at which the collision will occur if the vehicle trajectory is followed by the vehicle and at least one possible object trajectory is followed by the object. The collision time is compared to a threshold time value. The vehicle trajectory is deemed safe when the collision time is greater than the threshold time value.

In those or other scenarios, the collision check comprises determining whether the collision can be avoided if the vehicle trajectory is followed by the vehicle and any one of a plurality of dynamically generated emergency maneuvers is performed in a pre-defined period of time, when the collision time is equal to or less than the threshold time value. The vehicle is selectively caused to perform the emergency maneuver when a determination is made that the collision cannot be avoided in the pre-defined period of time. The dynamically generated emergency maneuvers may include, but are not limited to, an emergency maneuver that includes a braking command and is determined based on the vehicle trajectory and at least one possible object trajectory, an emergency maneuver that includes at least a steering command, and a braking command or an acceleration command, and that is determined via a gradient descent from an active vehicle trajectory on an objective function which penalizes collision and ride discomfort, and a pre-defined emergency maneuver that has been optimized via a gradient descent from the active vehicle trajectory on the objective function which penalizes collision and ride discomfort.

BRIEF DESCRIPTION OF THE DRAWINGS

The present solution will be described with reference to the following drawing figures, in which like numerals represent like items throughout the figures.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Real-time prediction of actions by drivers of other vehicles and pedestrians is a challenge for on-road semi-autonomous or autonomous vehicle applications. Such real-time prediction is particularly challenging when the drivers and/or pedestrians break traffic rules. Systematically assuming the worst case action from the drivers and/or pedestrians will paralyze the self-driving vehicle, but erroneously optimistic predictions can result in unsafe autonomous vehicle behavior.

This document describes methods and systems that are directed to addressing the problems described above, and/or other issues. Accordingly, the present solution concerns systems and methods for trajectory based safekeeping of vehicles. The methods involve: generating a vehicle trajectory for the vehicle that is in motion; detecting an object within a given distance from the vehicle; generating at least one possible object trajectory for the object which was detected; using the vehicle trajectory and at least one possible object trajectory to determine whether there is an undesirable level of risk that a collision will occur between the vehicle and the object; and modifying the vehicle trajectory when a determination is made that there is an undesirable level of risk that the collision will occur.

The undesirable level of risk determination is made by: determining whether the vehicle trajectory and at least one possible object trajectory intersect each other; and determining a collision time when the vehicle trajectory and at least one possible object trajectory intersect each other. The collision time comprises a time at which the collision will occur if the vehicle trajectory is followed by the vehicle and at least one possible object trajectory is followed by the object. The collision time is compared to a threshold time value. A determination is made that there is an undesirable level of collision risk when the collision time is equal to or less than the threshold time value.

The present solution also involves methods for operating a vehicle that involve: generating a vehicle trajectory for the vehicle that is in motion; detecting an object within a given distance from the vehicle; generating at least one possible object trajectory for the object which was detected; performing a collision check to determine that there remains time to react safely to worst-case behavior by the object (where the collision check is based on the vehicle trajectory and at least one possible object trajectory); and selectively causing the vehicle to perform an emergency maneuver based on results of the collision check.

The collision check comprises: determining whether the vehicle trajectory and at least one possible object trajectory intersect each other; determining a collision time when the vehicle trajectory and at least one possible object trajectory intersect each other; and comparing the collision time to a threshold time value. The collision time comprises a time at which the collision will occur if the vehicle trajectory is followed by the vehicle and at least one possible object trajectory is followed by the object.

The collision check also comprises: determining whether the collision can be avoided if the vehicle trajectory is followed by the vehicle and any one of a plurality of dynamically generated emergency maneuvers is performed in a pre-defined period of time, when the collision time is equal to or less than the threshold time value. The vehicle is selectively caused to perform the emergency maneuver (e.g., an accelerate-and-veer maneuver to avoid the collision)

when a determination is made that the collision cannot be avoided in the pre-defined period of time.

The present solution has many novel features. For example, unlike some conventional solutions, the complexity of the present solution is not exponential in the number of possible mover trajectories. The present solution also explicitly deviates from optimal behavior (in most-likely-case by the minimal steering/braking modification needed to keep the AV safe, and explicitly allows for an accelerate-and-veer maneuver if such a maneuver is necessary to avoid a collision. The present solution additionally allows generation and execution of AV plans that will collide with a worst-case predicted behavior from another mover, as long as a determination is made that there remains time to react safely to the worst-case behavior, should the event occur. This ability to selectively plan and execute a trajectory that collides with a worst-case predicted behavior from another actor, while still ensuring the AV is in a safe state, is key to preventing overly hesitant AV behavior. Finally, the present solution (1) computes a safe escape trajectory which can be rapidly executed in the future (without the need for additional planning) in the event that the worst-case predictions come true, or (2) computes a damage-minimization trajectory with the least-bad consequences (according to an application-defined smooth objective function) if (1) is not possible.

Illustrative Systems

Figure 1:
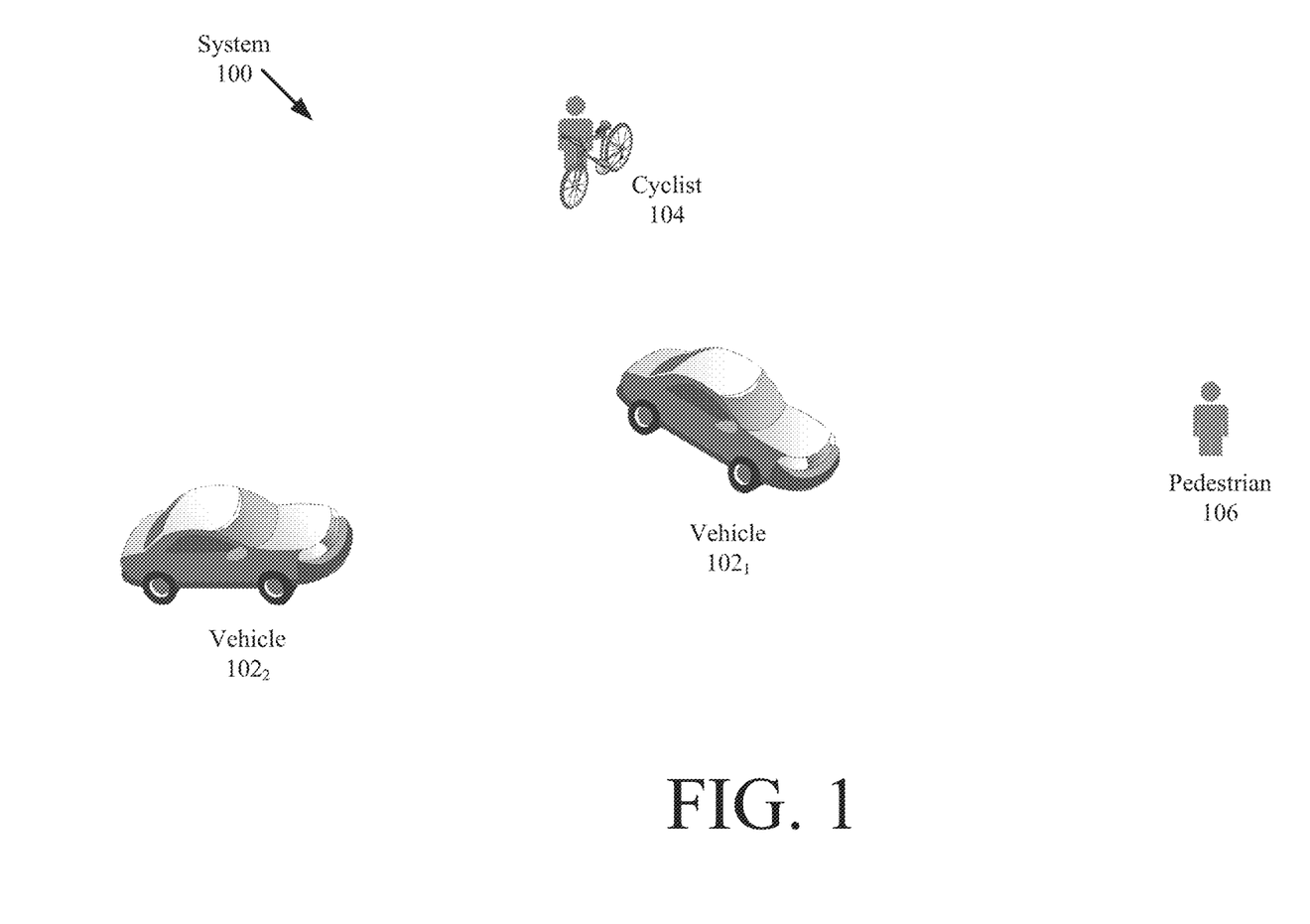
FIG. 1 is an illustration of an illustrative system.

Referring now to FIG. 1, there is provided an illustration of an illustrative system 100. System 100 comprises a vehicle $102_1$ that is traveling along a road in a semi-autonomous or autonomous manner. Vehicle $102_1$ is also referred to herein as an Autonomous Vehicle ("AV"). The AV $102_1$ can include, but is not limited to, a land vehicle (as shown in FIG. 1), an aircraft, or a watercraft.

AV $102_1$ is generally configured to detect objects $102_2$, 104, 106 in proximity thereto. The objects can include, but are not limited to, a vehicle $102_2$, cyclist 104 (such as a rider of a bicycle, electric scooter, motorcycle, or the like) and/or a pedestrian 106. When such a detection is made, AV $102_1$ performs operations to: generate one or more possible object trajectories for the detected object; and analyze at least one of the generated possible object trajectories to determine whether or not there is an undesirable level of risk that a collision will occur between the AV and object in a threshold period of time (e.g., 1 minute). If so, the AV $102_1$ performs operations to determine whether the collision can be avoided if a given vehicle trajectory is followed by the AV $102_1$ and any one of a plurality of dynamically generated emergency maneuvers is performed in pre-defined time period (e.g., N milliseconds). If the collision can be avoided, then the AV $102_1$ takes no action or optionally performs a cautious maneuver (e.g., mildly slows down). In contrast, if the collision cannot be avoided, then the AV $102_1$ immediately takes an emergency maneuver (e.g., brakes and/or changes direction of travel).

Figure 2:
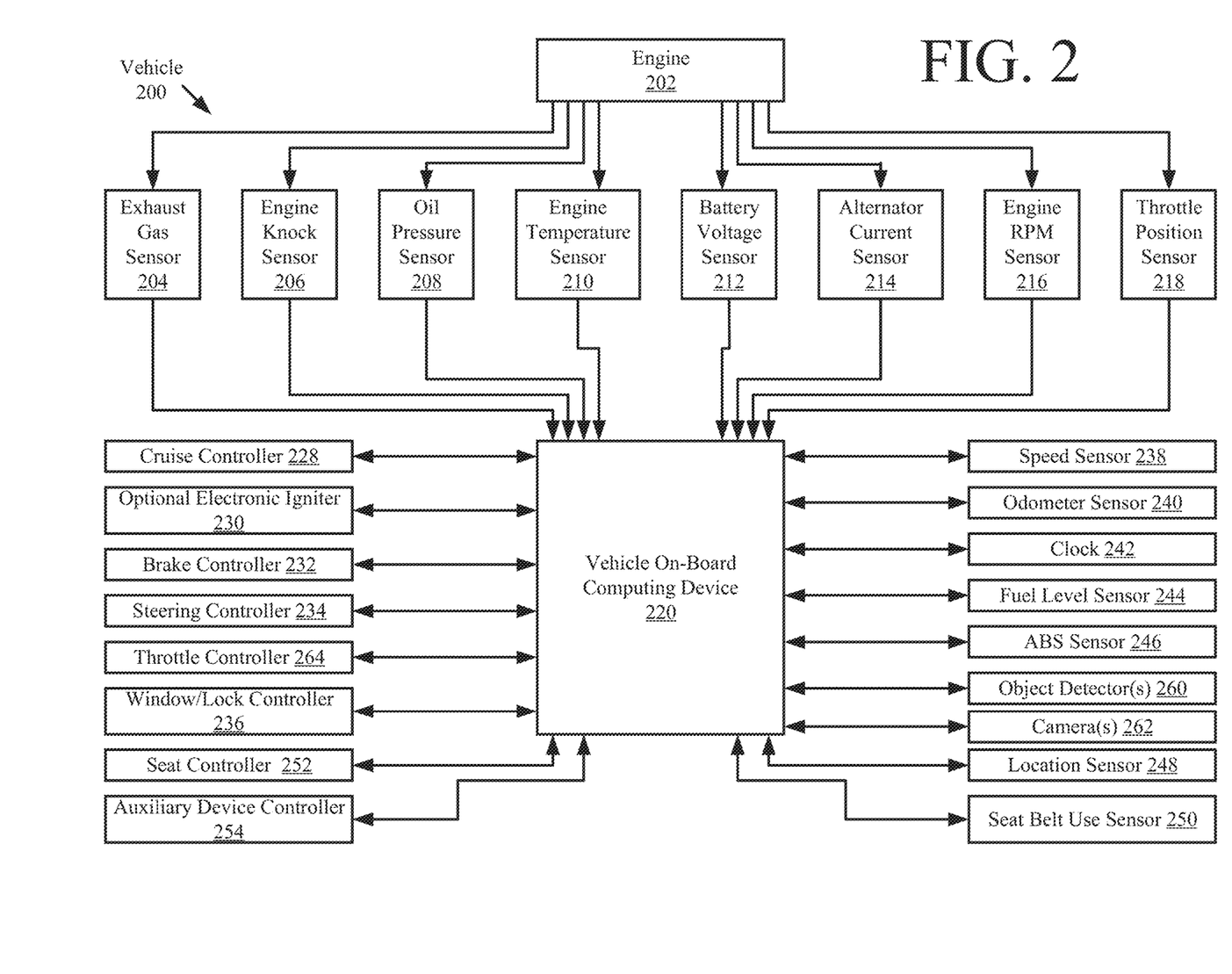
FIG. 2 is an illustration of an illustrative architecture for a vehicle.

Referring now to FIG. 2, there is provided an illustration of an illustrative system architecture 200 for a vehicle. Vehicles $102_1$ and/or $102_2$ of FIG. 1 can have the same or similar system architecture as that shown in FIG. 2. Thus, the following discussion of system architecture 200 is sufficient for understanding vehicle(s) $102_1$, $102_2$ of FIG. 1.

As shown in FIG. 2, the vehicle 200 includes an engine 202 and a plurality of sensors 204-218 measuring various parameters of the engine 202. Still, it should be noted that the sensors, in some examples, may comprise an exhaust gas sensor 204, an engine knock sensor 206, an oil pressure sensor 208, an engine temperature sensor 210, a battery voltage sensor 212, an alternator current sensor 214, an engine RPM sensor 216, and a throttle position sensor 218. Other sensors 238, 240, 244-250, 260 are also provided in the vehicle 200. These sensors include a speed sensor 238, an odometer sensor 240, a fuel level sensor 244, an ABS sensor 246, a location sensor 248 (e.g., a GPS device), a seat belt use sensor 250, and/or object detectors 260. Vehicle 200 also comprise one or more cameras 262. The object detectors 260 and/or cameras 262 allow an object to be detected within a given distance range of the vehicle 200 in any direction.

During operations, information is communicated from the sensors 238, 240, 244-250, to an on-board computing device 220. The on-board computing device 220 analyzes the engine parameter measurement data from the sensors 204-218, and optionally controls operations of the vehicle based on results of the analysis. For example, the on-board computing device 220 controls braking via a brake controller 232. The brake controller 232 can include a camera. Alternatively or additionally, the following features of the vehicle are controlled: engine speed via throttle controller 264; vehicle speed via throttle controller 264; gear of transmission; and/or vehicle steering via steering controller 234. The present solution is not limited in this regard. Other operations of the vehicle 200 can be controlled by the on-board computing device 220 via a cruise controller 228, an electronic ignitor 230, a window/lock controller 236, and/or a seat controller. Auxiliary devices of the vehicle can be controlled via the auxiliary device controller 254. The auxiliary devices include, but are not limited to, a radio, a display, a near-field or short-range (e.g., Bluetooth™) enabled device (e.g., a mobile phone or SRC-System™) or any other device (e.g., a speed radar) communicatively coupled to the on-board computing device 220.

Object detection information is communicated from object detector(s) 260 to the on-board computing device 220. Additionally, captured images are communicated from the camera(s) 262 to the on-board computing device 220. The object detection information and/or captured images are processed by the on-board computing device 220 to detect objects in proximity to the vehicle 200. Techniques for making an object detection based on sensor data and/or captured images are well known in the art. Any known or to be known technique for making an object detection based on sensor data and/or captured images can be used herein. made When such an object detection is made, the on-board computing device 220 performs operations to: generate one or more possible object trajectories for the detected object; and analyze at least one of the generated possible object trajectories to determine if there is a risk of a collision in a threshold period of time (e.g., 1 minute). If so, the on-board computing device 220 performs operations to determine whether the collision can be avoided if a given vehicle trajectory is followed by the vehicle 200 and any one of a plurality of dynamically generated emergency maneuvers is performed in pre-defined time period (e.g., N milliseconds). If the collision can be avoided, then the on-board computing device 220 takes no action to change the vehicle trajectory or optionally causes the vehicle 200 to perform a cautious maneuver (e.g., mildly slows down). In contrast, if the collision cannot be avoided, then the on-board computing device 220 causes the vehicle 200 to immediately take an emergency maneuver (e.g., brakes and/or changes direction of travel).

Figure 3:
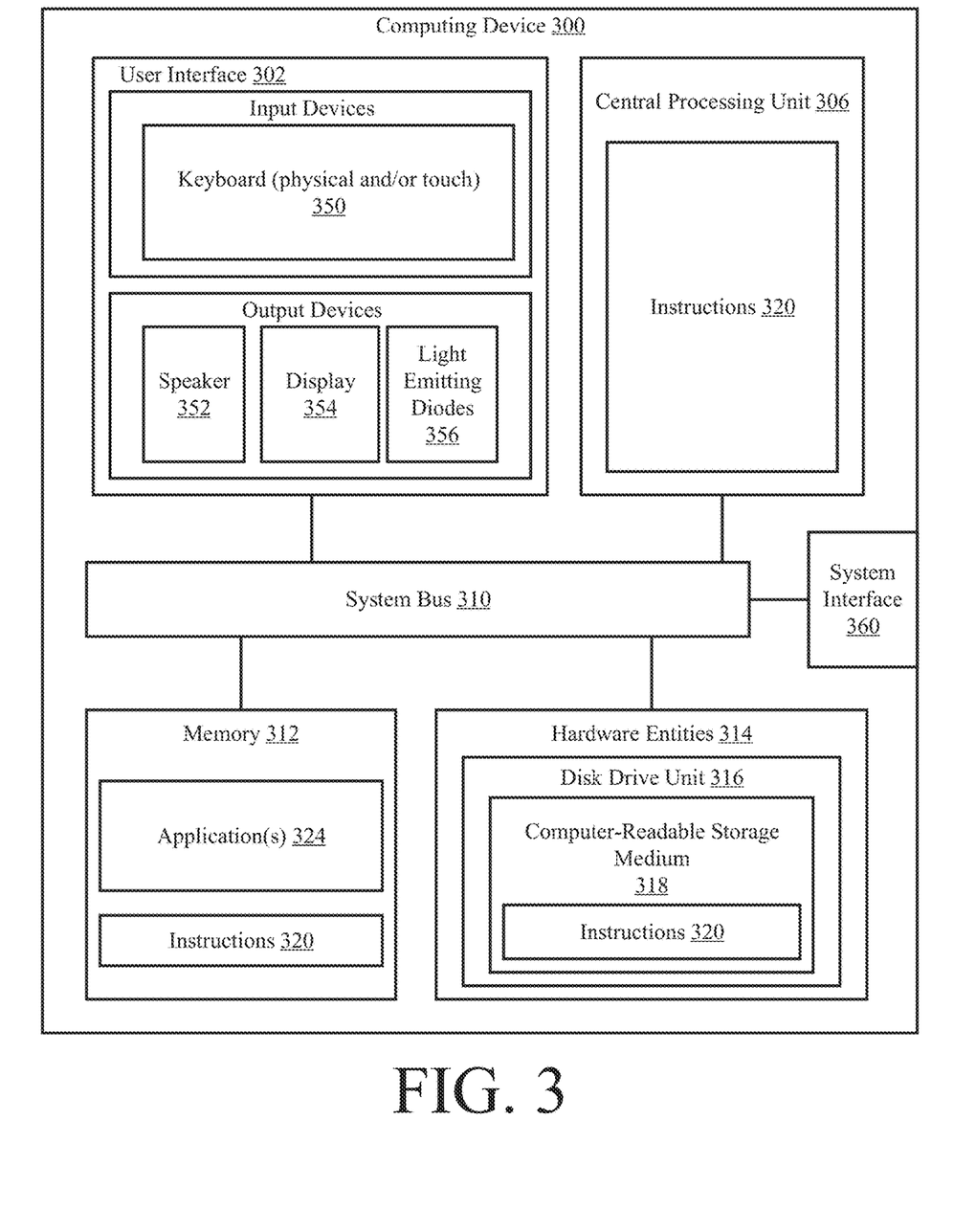
FIG. 3 is an illustration of an illustrative computing device.

Referring now to FIG. 3, there is provided an illustration of an illustrative architecture for a computing device 300. The vehicle on-board computing device 220 of FIG. 2 is the same as or similar to computing device 300. As such, the discussion of computing device 300 is sufficient for understanding the vehicle on-board computing device 220 of FIG. 2.

Computing device 300 may include more or less components than those shown in FIG. 3. However, the components shown are sufficient to disclose an illustrative solution implementing the present solution. The hardware architecture of FIG. 3 represents one implementation of a representative computing device configured to operate a vehicle, as described herein. As such, the computing device 300 of FIG. 3 implements at least a portion of the method(s) described herein.

Some or all components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit ("CPU") 306, a system bus 310, a memory 312 connected to and accessible by other portions of computing device 300 through system bus 310, a system interface 360, and hardware entities 314 connected to system bus 310. The user interface can include input devices and output devices, which facilitate user-software interactions for controlling operations of the computing device 300. The input devices include, but are not limited to, a physical and/or touch keyboard 350. The input devices can be connected to the computing device 300 via a wired or wireless connection (e.g., a Bluetooth® connection). The output devices include, but are not limited to, a speaker 352, a display 354, and/or light emitting diodes 356. System interface 360 is configured to facilitate wired or wireless communications to and from external devices (e.g., network nodes such as access points, etc.).

At least some of the hardware entities 314 perform actions involving access to and use of memory 312, which can be a Random Access Memory ("RAM"), a disk drive, flash memory, a Compact Disc Read Only Memory ("CD-ROM") and/or another hardware device that is capable of storing instructions and data. Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

Figure 4:
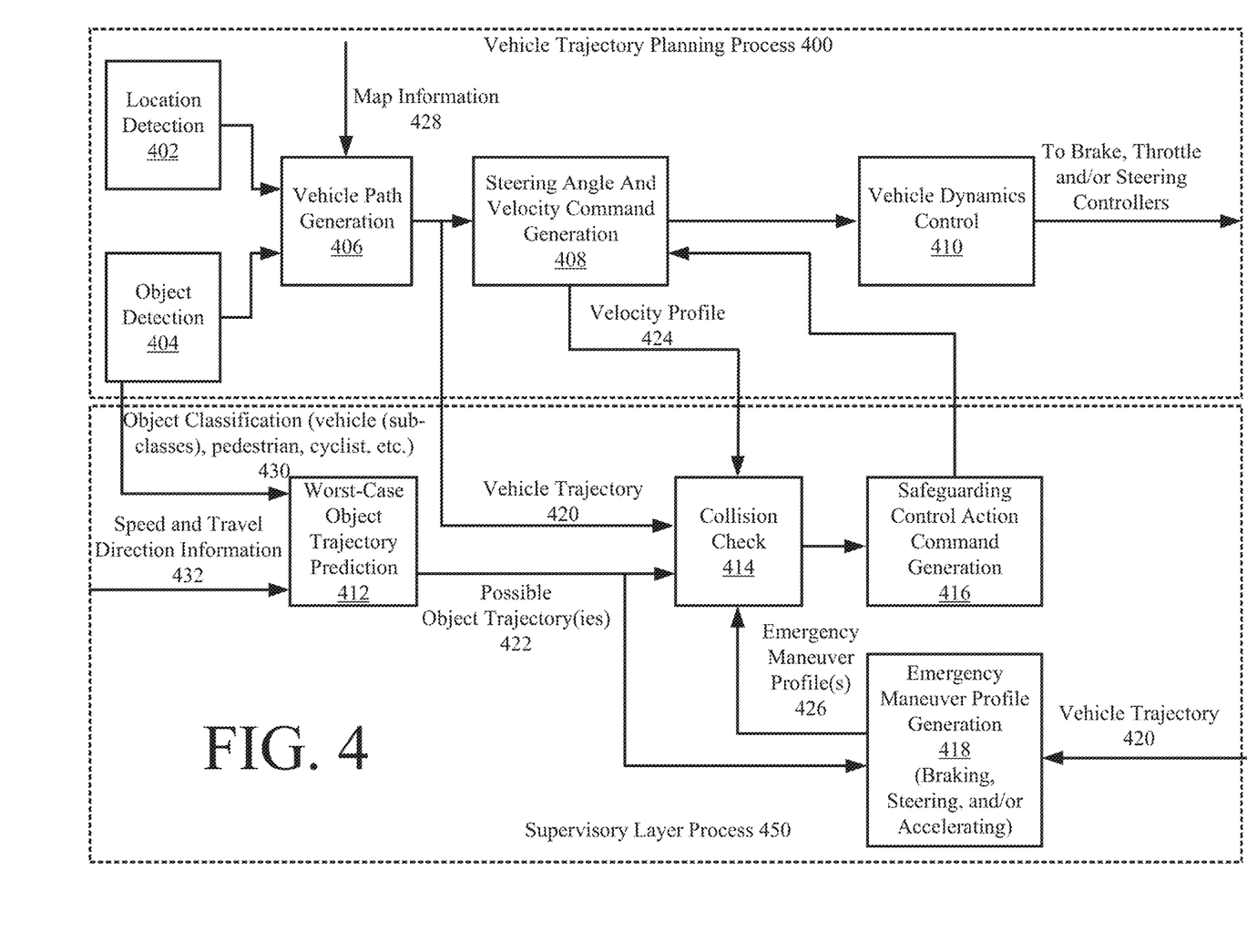
FIG. 4 provides a block diagram that is useful for understanding how trajectory based safekeeping of vehicles is achieved in accordance with the present solution.

Referring now to FIG. 4, there is provided a block diagram that is useful for understanding how trajectory based safekeeping of vehicles is achieved in accordance with the present solution. All of the operations performed in blocks 402-418 can be performed by the on-board computing device of a vehicle (e.g., AV 102$_1$ of FIG. 1).

In block 402, a location of the vehicle is detected. This detection can be made based on sensor data output from a location sensor (e.g., location sensor 248 of FIG. 2) of the vehicle. This sensor data can include, but is not limited to, Global Positioning System ("GPS") data. The detected location of the vehicle is then passed to block 406.

In block 404, an object is detected within proximity of the vehicle. This detection is made based on sensor data output from an object detector (e.g., object detector 260 of FIG. 2) or a camera (e.g., camera 262 of FIG. 2) of the vehicle. Information about the detected object is passed to block 406. This information includes, but is not limited to, a speed of the object and/or a direction of travel of the object.

In block 406, a vehicle trajectory is generated using the information from blocks 402 and 404. Techniques for determining a vehicle trajectory are well known in the art, and therefore will not be described herein. Any known or to be known technique for determining a vehicle trajectory can be used herein without limitation. In some scenarios, the vehicle trajectory 420 is determined based on the location information from block 402, the object detection information from block 404, and map information 428 (which is pre-stored in a data store of the vehicle). The vehicle trajectory 420 represents a smooth path that does not have abrupt changes that would otherwise provide passenger discomfort. The vehicle trajectory 420 is then provided to block 408.

In block 408, a steering angle and velocity command is generated based on the vehicle trajectory 420. The steering angle and velocity command is provided to block 410 for vehicle dynamics control.

Notably, the present solution augments the above-described vehicle trajectory planning process 400 of blocks 402-410 with an additional supervisory layer process 450. The additional supervisory layer process 450 optimizes the vehicle trajectory for the most likely behavior of the objects detected in block 404, but nonetheless maintains safety if worst-case behaviors occurs. This additional supervisory layer process 450 is implemented by blocks 412-418.

As shown in FIG. 4, an object classification is performed in block 404 to classify the detected object into one of a plurality of classes and/or sub-classes. The classes can include, but are not limited to, a vehicle class and a pedestrian class. The vehicle class can have a plurality of vehicle sub-classes. The vehicle sub-classes can include, but are not limited to, a bicycle sub-class, a motorcycle sub-class, a skateboard sub-class, a roller blade sub-class, a scooter sub-class, a sedan sub-class, an SUV sub-class, and/or a truck sub-class. The object classification is made based on sensor data output from an object detector (e.g., object detector 260 of FIG. 2) and/or a camera (e.g., camera 262 of FIG. 2) of the vehicle. Techniques for classifying objects based on sensor data and/or imagery data are well known in the art, and therefore will not be described herein. Any known or to be known object classification technique can be used herein without limitation. Information 430 specifying the object's classification is provided to block 412, in addition to the information 432 indicating the object's actual speed and direction of travel.

Block 412 involves determining one or more possible object trajectories for the object detected in 404. The possible object trajectories can include, but are not limited to, the following trajectories:

a trajectory defined by the object's actual speed (e.g., 1 mile per hour) and actual direction of travel (e.g., west);

a trajectory defined by the object's actual speed (e.g., 1 mile per hour) and another possible direction of travel (e.g., south, south-west, or X (e.g., 40°) degrees from the object's actual direction of travel in a direction towards the AV) for the object;

a trajectory defined by another possible speed for the object (e.g., 2-10 miles per hour) and the object's actual direction of travel (e.g., west); and/or a trajectory defined by another possible speed for the object (e.g., 2-10 miles per hour) and another possible direction of travel (e.g., south, south-west, or X (e.g., 40°) degrees from the object's actual direction of travel in a direction towards the AV) for the object.

The possible speed(s) and/or possible direction(s) of travel may be pre-defined for objects in the same class and/or sub-class as the object. The one or more possible object trajectories 422 is(are) then passed to block 414.

In the case that two or more possible object trajectories are determined, then 412 may optionally also involve selecting one of the possible object trajectories which provides a worst-case collision scenario for the AV. This determination is made based on information 432 indicating the AV's actual speed and direction of travel. The selected possible object trajectory is then passed to block 414, instead of all the possible object trajectories determined in 412.

In block 414, a collision check is performed for each of the possible object trajectories 422 passed to block 414. The collision check involves determining whether there is an undesirable level of risk that a collision will occur between the vehicle and the object. Such a determination is made by first determining if the vehicle trajectory 420 and a given possible object trajectory 422 intersect. If the two trajectories 420, 422 do not intersect, then the vehicle trajectory 420 is deemed to be a safe vehicle trajectory and no safeguarding control action is taken to modify the vehicle trajectory.

In contrast, if the two trajectories 420, 422 do intersect, then a predicted time at which a collision would occur if the two trajectories are followed is determined. The predicted time is compared to a threshold value (e.g., 1 second). If the predicted time exceeds the threshold value, then the vehicle trajectory 420 is deemed to be a safe vehicle trajectory and no safeguarding control action is taken to modify the vehicle trajectory.

If the predicted time is equal to or less than the threshold value, then a determination is made as to whether the collision can be avoided if (a) the vehicle trajectory is followed by the AV and (b) any one of a plurality of dynamically generated emergency maneuvers is performed in a pre-defined time period (e.g., N milliseconds). The dynamically generated emergency maneuvers include, but are not limited to, the following:

an emergency maneuver that comprises a braking command and that is determined based on the vehicle trajectory and a possible object trajectory;

an emergency maneuver that comprises at least a steering command, and a braking command or an acceleration command, and that is determined via a gradient descent from the active AV trajectory on an objective function which penalizes collision and/or ride discomfort; and/or an emergency maneuver that comprises a pre-defined emergency maneuver that has been optimized via a gradient descent from the active AV trajectory on an objective function which penalizes collision and/or ride discomfort.

In some scenarios, an emergency braking maneuver is produced by postulating a trajectory that maintains the intended trajectory for the pre-defined time period (N milliseconds) and then decelerates at a maximum braking profile parameterized by maximum allowable deceleration and jerk limits. The maximum braking profile is produced along the original trajectory via Euler integration of a new velocity profile, or by other methods. The present solution is not limited to the particulars of these scenarios.

In those or other scenarios, an emergency maneuver that comprises both steering and braking is generated by: parameterizing both steering and braking with a limited set of spline points (e.g., 4 spline points for steering and 3 spline points for velocity); minimizing an objective function which penalizes collision and/or ride discomfort, as a function of those parameters, using conjugate gradient descent, Newton's method, Powell's method, or other existing method(s) for minimizing multivariate functions; and computing the trajectory corresponding from the parameterized spline points with the minimal objective function cost. The present solution is not limited to the particulars of these scenarios.

In those or other scenarios, a pre-defined emergency maneuver is generated by recording commands from a human operator during a simulated emergency braking event, or by sampling a small set of steering torques and braking profiles applied to the current vehicle state. These torques are computed at constant intervals from zero up until the limits of the steering and brake mechanism, or by other methods. The present solution is not limited to the particulars of these scenarios.

If it is determined that the collision can be avoided in the pre-defined time period, then the vehicle trajectory 420 is deemed to be a safe vehicle trajectory and no safeguarding control action is taken to modify the vehicle trajectory. Alternatively, the AV is caused to perform a cautious maneuver (e.g., mildly slow down such as by 5-10 mph). Techniques for causing an AV to take a cautious maneuver such as slowing down are well known in the art, and therefore will not be described herein. For example, a safeguarding control action command is generated as shown by 416, and used to adjust or otherwise modify the vehicle trajectory at 408 prior to being passed to block 410. The vehicle trajectory can be adjusted or otherwise modified to cause the vehicle to decelerate, cause the vehicle to accelerate, and/or cause the vehicle to change its direction of travel.

In contrast, if it is determined that the collision cannot be avoided in the pre-defined time period, then the AV is caused to immediately take an emergency maneuver. This emergency maneuver may include one of the dynamically generated emergency maneuvers discussed above. Techniques for causing an AV to take emergency maneuvers are well known in the art, and therefore will not be described herein.

Illustrative Methods

Referring now to FIG. 5, there is provided a flow diagram of an illustrative method 500 for trajectory based safekeeping of vehicles (e.g., vehicle $102_1$ of FIG. 1). At least a portion of method 500 is performed by a vehicle on-board computing device (e.g., vehicle on-board computing device 220 of FIG. 2). Method 500 is performed for each object (e.g., vehicle $102_2$ of FIG. 1, cyclist 104 of FIG. 1, and/or pedestrian 106 of FIG. 1) that has been detected to be within a distance range from the vehicle at any given time.

Method 500 comprises a plurality of operations 502-530. The present solution is not limited to the particular order of operations 502-530 shown in FIG. 5. For example, the operations of 520 can be performed in parallel with the operations of 504-518, rather than subsequent to as shown in FIG. 5.

Figure 5A:
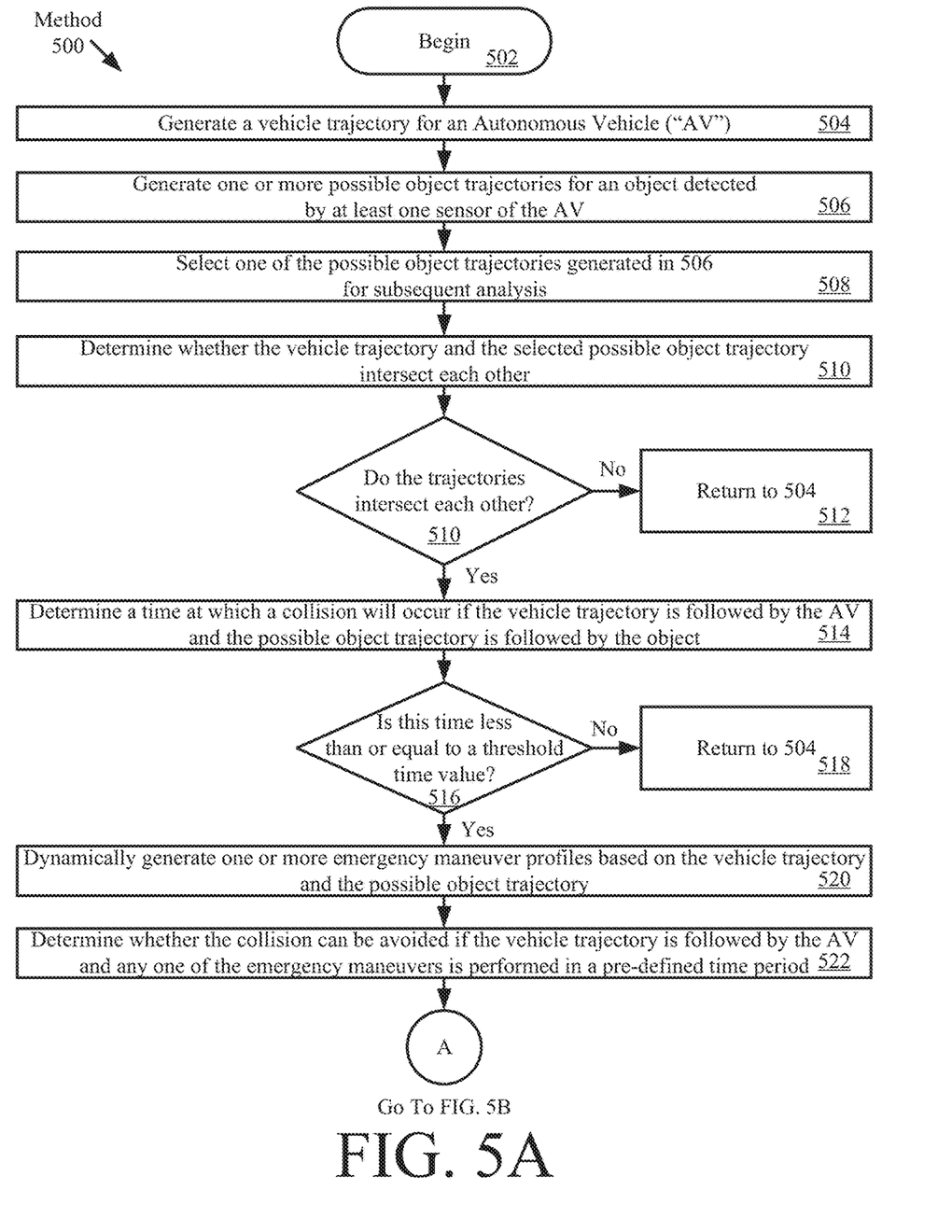
FIGS. 5A-5B (collectively referred to herein as "FIG. 5") provides a flow diagram of an illustrative method for trajectory based safekeeping of vehicles.

As shown in FIG. 5A, method 500 begins with 502 and continues with 504 where a vehicle trajectory (e.g., vehicle trajectory 420 of FIG. 4) for an AV is generated. The vehicle trajectory represents a smooth path that does not have abrupt changes that would otherwise provide passenger discomfort. Techniques for determining a vehicle trajectory are well known in the art, and therefore will not be described here. Any known or to be known technique for determining a vehicle trajectory can be used herein without limitation. In some scenarios, the vehicle trajectory is determined based on location information generated by a location sensor (e.g., location sensor 248 of FIG. 2) of the AV, object detection information generated by at least one object detector (e.g., object detector 260 of FIG. 2) of the AV, images captured by at least one camera (e.g., camera 262 of FIG. 2) of the AV, and map information stored in a memory (e.g., memory 312 of FIG. 3) of the AV. In other scenarios, lane information is used as an alternative to or in addition to the location information and/or map information.

Once the vehicle trajectory is generated, method 500 continues with 506 where one or more possible object trajectories (e.g., possible object trajectories 422 of FIG. 4) are determined for an object (e.g., vehicle $102_2$, cyclist 104 or pedestrian 106 of FIG. 1) detected by at least one sensor (e.g., sensor 260 or camera 262 of FIG. 2) of the AV. The possible object trajectories can include, but are not limited to, the following trajectories: a trajectory defined by the object's actual speed (e.g., 1 mile per hour) and actual direction of travel (e.g., west); a trajectory defined by the object's actual speed (e.g., 1 mile per hour) and another possible direction of travel (e.g., south, south-west, or X (e.g., 40°) degrees from the object's actual direction of travel in a direction towards the AV); a trajectory defined by another possible speed for the object (e.g., 2-10 miles per hour) and the object's actual direction of travel (e.g., west); and/or a trajectory defined by another possible speed for the object (e.g., 2-10 miles per hour) and another possible direction of travel (e.g., south or south-west or X (e.g., 40°) degrees from the object's actual direction of travel in a direction towards the AV). The possible speed(s) and/or possible direction(s) of travel may be pre-defined for objects in the same class and/or sub-class as the object.

Next in 508, one of the possible object trajectories is selected for subsequent analysis. In some scenarios, the operations of 510-528 are performed (e.g., in an iterative or parallel manner) for each possible object trajectory generated in 506. In other scenarios, the operations of 510-528 are performed for only one of the possible object trajectories which provides a worst-case collision scenario for the AV. This worst-case possible object trajectory is selected based on information indicating the AV's actual speed and direction of travel (e.g., generated by a speed sensor 238 of FIG. 2 and/or location sensor 248 of FIG. 2). A worst-collision scenario may include, but is not limited to, a collision scenario which is to occur sooner than all other collision scenarios provided by the possible object trajectories and/or is expected to result in serious injury or death (e.g., a high speed, side-impact collision or a high speed, head-on collision). In yet other scenarios, the operations 510-528 are performed for two or more of the possible object trajectories which provide the top Z (e.g., 2 or 5) worst-case collision scenarios for the AV. Z is an integer selected in accordance with a particular application. The present solution is not limited to the particulars of these scenarios.

In next 510, a determination is made as to whether the vehicle trajectory generated in 504 and the possible object trajectory selected in 508 intersect each other. If the two trajectories do not intersect each other [510:NO], then 512 is performed where method 500 returns to 504.

In contrast, if the two trajectories do intersect each other [510:YES], then method 500 continues to 514 where a time value is determined. This time value represents a time at which a collision will occur if the vehicle trajectory is followed by the AV and the possible object trajectory is followed by the object. The time value determined in 514 is then compared to a threshold time value, as shown by 516. The threshold time value is selected in accordance with a given application (e.g., one or more seconds). If the time value is greater than the threshold time value [516:NO], then 518 is performed where method 500 returns to 504. If the time value is equal to or less than the threshold time value [516:YES], then method 500 continues with 520-522. 520-522 involve: dynamically generating one or more emergency maneuver profiles based on the vehicle trajectory and the possible object trajectory; and determine whether the collision can be avoided if the vehicle trajectory is followed by the AV and any one of the emergency maneuvers is performed in a pre-defined time period (e.g., N milliseconds). Upon completing 522, method 500 continues with 524 of FIG. 5B.

Figure 5B:
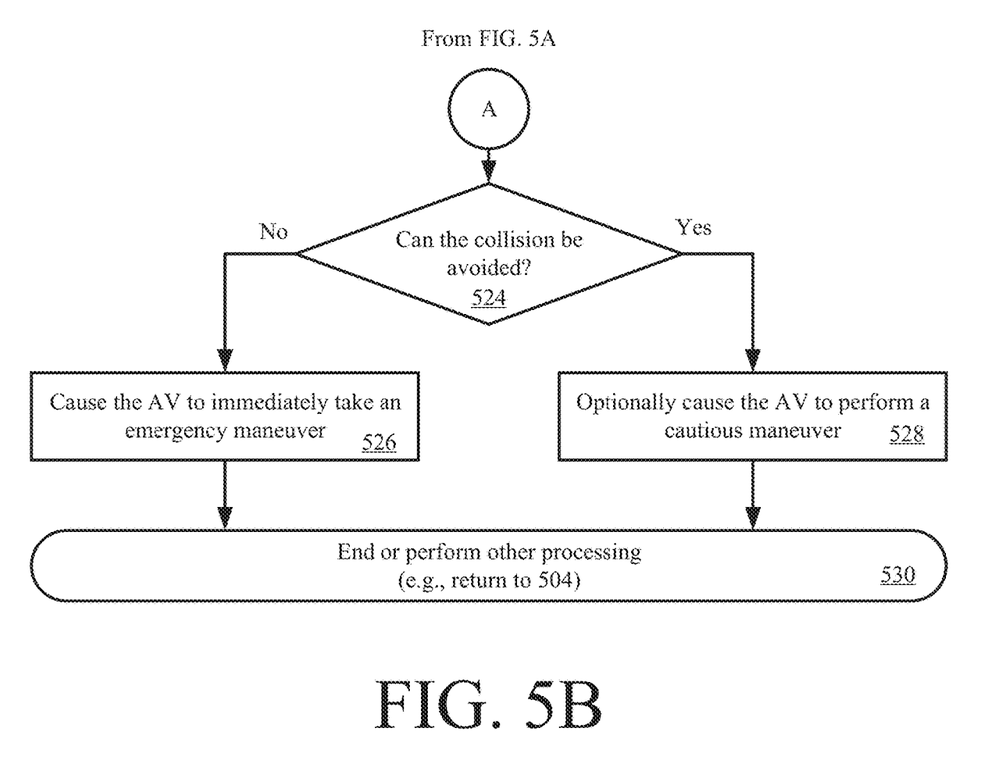

Referring now to FIG. 5B, if the collision cannot be avoided in the pre-defined time period [524:NO], then 526 is performed where the AV is caused to immediately take an emergency maneuver. The emergency maneuver can include, but is not limited to, one of the dynamically generated emergency maneuvers discussed above in relation to 520. Techniques for causing an AV to take emergency maneuvers are well known in the art, and therefore will not be described herein. Any known or to be known technique for causing an AV to take emergency maneuvers can be used here. Subsequently, 530 is performed where method 500 ends or other processing is performed.

In contrast, if the collision can be avoided in the pre-defined time period [524:YES], then 528 is performed where the AV is optionally caused to perform a cautious maneuver (e.g., mildly slow down). Techniques for causing an AV to take a cautious maneuver such as slowing down are well known in the art, and therefore will not be described herein. Any known or to be known technique for causing an AV to take a cautious maneuver can be used here. Subsequently, 530 is performed where method 500 ends or other processing is performed.

The following text outlines an illustrative process for providing rapid collision checking of the same path along multiple velocity profiles, for efficient implementation of the above described method. First, a table of intersections is generated between real time predictions of drive actions and a polygon defined by a trajectory. The polygon is created by the autonomous vehicles trajectory, the autonomous vehicles dimensions, and a vector of projections of the autonomous vehicle along a distance. This prepares the intersection table and the real time projection set needed for the rest of the process. Next, a determination is made as to whether a candidate list of autonomous vehicle projections violates collision rules. If not, then the trajectory is considered safe. Temporal profiles for pedestrians, cars, statics and other movable things are obtained. Thereafter, a modified autonomous vehicle trajectory projection list is generated based on the temporal profiles. Least-conflicted projections for a given collision table are computed using the modified autonomous vehicle trajectory projection list. A modified motion control trajectory is computed based on the least-conflicted projections. This is needed to create a trajectory in the form needed for actual execution. The present solution is not limited to the particulars of this illustrative process.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a vehicle, comprising:
   generating, by a computing device, a vehicle trajectory for the vehicle that is in motion;
   detecting an object within a given distance from the vehicle;
   generating, by the computing device, at least one possible object trajectory for the object which was detected;
   performing, by the computing device, a collision check to determine that there remains time to react safely to worst-case behavior by the object, the collision check being based on the vehicle trajectory and the at least one possible object trajectory; and
   performing operations, by the computing device, to selectively cause the vehicle to perform an emergency maneuver based on results of the collision check;
   wherein the collision check comprises:
   determining whether the vehicle trajectory and the at least one possible object trajectory intersect each other;
   determining a collision time when the vehicle trajectory and the at least one possible object trajectory intersect each other, the collision time comprising a time at which the collision will occur if the vehicle trajectory is followed by the vehicle and the at least one possible object trajectory is followed by the object;
   comparing the collision time to a threshold time value; and
   determining whether the collision can be avoided if the vehicle trajectory is followed by the vehicle and any one of a plurality of dynamically generated emergency maneuvers is performed in a pre-defined period of time, when the collision time is equal to or less than the threshold time value.

2. The method according to claim 1, wherein the vehicle is selectively caused to perform the emergency maneuver when a determination is made that the collision cannot be avoided in the pre-defined period of time.

3. The method according to claim 1, wherein the plurality of dynamically generated emergency maneuvers comprise
   an emergency maneuver that includes a braking command and is determined based on the vehicle trajectory and the selected possible object trajectory,
   an emergency maneuver that includes at least a steering command, and a braking command or an acceleration command, and that is determined via a gradient descent from an active vehicle trajectory on an objective function which penalizes collision and ride discomfort, and
   a pre-defined emergency maneuver that has been optimized via a gradient descent from the active vehicle trajectory on the objective function which penalizes collision and ride discomfort.

4. A method for operating a vehicle, comprising:
   generating, by a computing device, a vehicle trajectory for the vehicle that is in motion;
   detecting an object within a given distance from the vehicle;
   generating, by the computing device, at least first and second possible object trajectories for the object which was detected;
   selecting, by the computing device, a possible object trajectory from the first and second possible object trajectories which provides a worst-case collision scenario for the vehicle;
   performing, by the computing device, a collision check to determine that there remains time to react safely to the worst-case collision scenario, the collision check being based on the vehicle trajectory and the selected possible object trajectory; and
   performing operations, by the computing device, to selectively cause the vehicle to perform an emergency maneuver based on results of the collision check.

5. The method according to claim 4, wherein the collision check comprises determining whether the vehicle trajectory and the selected possible object trajectory intersect each other.

6. The method according to claim 5, wherein the vehicle trajectory is deemed safe when a determination is made that the vehicle trajectory and the selected possible object trajectory do not intersect each other.

7. The method according to claim 5, wherein the collision check further comprises determining a collision time when the vehicle trajectory and the selected possible object trajectory intersect each other, the collision time comprising a time at which the collision will occur if the vehicle trajectory is followed by the vehicle and the selected possible object trajectory is followed by the object.

8. The method according to claim 7, wherein the collision check further comprises comparing the collision time to a threshold time value.

9. The method according to claim 8, wherein the vehicle trajectory is deemed safe when the collision time is greater than the threshold time value.

10. The method according to claim 4, further comprising causing the vehicle to perform a cautious maneuver instead of the emergency maneuver based on the results of a collision check.

11. The method according to claim 4, wherein the emergency maneuver comprises an accelerate-and-veer maneuver to avoid a collision.

12. The method according to claim 4, wherein the possible object trajectory is selected from the first and second possible object trajectories based on at least one of a speed of the vehicle and a direction of travel of the vehicle.

13. A system, comprising:
   a processor;
   a non-transitory computer-readable storage medium comprising programming instructions that are configured to cause the processor to implement a method for operating a vehicle, wherein the programming instructions comprise instructions to:
   generate a vehicle trajectory for the vehicle that is in motion;
   detect an object within a given distance from the vehicle;

generate at least one possible object trajectory for the object which was detected;

perform a collision check to determine that there remains time to react safely to worst-case behavior by the object, the collision check being based on the vehicle trajectory and the at least one possible object trajectory; and selectively cause the vehicle to perform an emergency maneuver based on results of the collision check;

wherein the collision check comprises:

determining whether the vehicle trajectory and the at least one possible object trajectory intersect each other;

determining a collision time when the vehicle trajectory and the at least one possible object trajectory intersect each other, the collision time comprising a time at which the collision will occur if the vehicle trajectory is followed by the vehicle and the at least one possible object trajectory is followed by the object;

comparing the collision time to a threshold time value; and determining whether the collision can be avoided if the vehicle trajectory is followed by the vehicle and any one of a plurality of dynamically generated emergency maneuvers is performed in a pre-defined period of time, when the collision time is equal to or less than the threshold time value.

14. The system according to claim 13, wherein the vehicle is selectively caused to perform the emergency maneuver when a determination is made that the collision cannot be avoided in the pre-defined period of time.

15. The system according to claim 13, wherein the plurality of dynamically generated emergency maneuvers comprise an emergency maneuver that includes a braking command and is determined based on the vehicle trajectory and the selected possible object trajectory, an emergency maneuver that includes at least a steering command, and a braking command or an acceleration command, and that is determined via a gradient descent from an active vehicle trajectory on an objective function which penalizes collision and ride discomfort, and a pre-defined emergency maneuver that has been optimized via a gradient descent from the active vehicle trajectory on the objective function which penalizes collision and ride discomfort.

16. A system, comprising:

a processor;

a non-transitory computer-readable storage medium comprising programming instructions that are configured to cause the processor to implement a method for operating a vehicle, wherein the programming instructions comprise instructions to:

generate a vehicle trajectory for the vehicle that is in motion;

detect an object within a given distance from the vehicle;

generate at least first and second possible object trajectories for the object which was detected;

select a possible object trajectory from the first and second possible object trajectories which provides a worst-case collision scenario for the vehicle;

perform a collision check to determine that there remains time to react safely to the worst-case collision scenario, the collision check being based on the vehicle trajectory and the selected possible object trajectory; and selectively cause the vehicle to perform an emergency maneuver based on results of the collision check.

17. The system according to claim 16, wherein the collision check comprises determining whether the vehicle trajectory and the selected possible object trajectory intersect each other.

18. The system according to claim 17, wherein the vehicle trajectory is deemed safe when a determination is made that the vehicle trajectory and the selected possible object trajectory do not intersect each other.

19. The system according to claim 17, wherein the collision check further comprises determining a collision time when the vehicle trajectory and the selected possible object trajectory intersect each other, the collision time comprising a time at which the collision will occur if the vehicle trajectory is followed by the vehicle and the selected possible object trajectory is followed by the object.

20. The system according to claim 19, wherein the collision check further comprises comparing the collision time to a threshold time value.

21. The system according to claim 20, wherein the vehicle trajectory is deemed safe when the collision time is greater than the threshold time value.

* * * * *